US009227580B2

(12) United States Patent
Puzenat

(10) Patent No.: US 9,227,580 B2
(45) Date of Patent: Jan. 5, 2016

(54) METHOD AND SYSTEM FOR DISABLING AND ENABLING AN ELECTRIC MOTOR VEHICLE CONTROL MODULE

(71) Applicant: Valeo Systemes Thermiques, Le Mesnil Saint Denis (FR)

(72) Inventor: Bertrand Puzenat, Montigny le Bretonneux (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 0 days.

(21) Appl. No.: 14/409,180

(22) PCT Filed: Jun. 19, 2013

(86) PCT No.: PCT/EP2013/062697
§ 371 (c)(1),
(2) Date: Dec. 18, 2014

(87) PCT Pub. No.: WO2013/189963
PCT Pub. Date: Dec. 27, 2013

(65) Prior Publication Data
US 2015/0175099 A1 Jun. 25, 2015

(30) Foreign Application Priority Data
Jun. 19, 2012 (FR) ..................................... 12 01736

(51) Int. Cl.
*B60L 11/00* (2006.01)
*B60K 6/20* (2007.10)
(Continued)

(52) U.S. Cl.
CPC ............... *B60R 16/0231* (2013.01); *B60L 3/00* (2013.01); *B60L 3/0069* (2013.01)

(58) Field of Classification Search
CPC ..... B60L 3/00; B60L 3/0069; B60R 16/0231; B60Q 1/387
USPC ................. 701/22, 83, 84, 70, 490; 903/930; 180/65.1–65.8, 65.21; 340/995.1, 340/995.19
See application file for complete search history.

(56) References Cited

U.S. PATENT DOCUMENTS

2006/0124367 A1* 6/2006 Georgii ............... B60L 11/1887 180/65.31

(Continued)

FOREIGN PATENT DOCUMENTS

EP 2164162 A1 3/2010

(Continued)

OTHER PUBLICATIONS

English language abstract and machine-assisted English translation for JP2008017595 extracted from espacenet.com database on Dec. 31, 2014, 16 pages.

(Continued)

*Primary Examiner* — Muhammad Shafi
(74) *Attorney, Agent, or Firm* — Howard & Howard Attorneys PLLC

(57) ABSTRACT

The invention pertains to an electronic control module (3) for a motor vehicle electrical circuit (1), intended to be linked in a galvanically isolated manner to a motor vehicle electrical circuit (1) comprising at least one functional module (5) powered at high voltage, the control module comprising: —a connection bus (9), intended to be linked to an exterior interface (7), configured so as to conduct low-voltage electrical setpoint signals, emanating from the exterior interface (7) to the elements of the control module (3) to which they are addressed, —a microcontroller (1), configured to control the at least one functional module (5) as a function of the setpoint signals, characterized in that the microcontroller (11) and the connection bus (9) are linked by a non-galvanic coupler (13), provided with a low-voltage part (131) and with a high-voltage part (133), which are able to exchange at least one signal and are galvanically decoupled, and in that the control module furthermore comprises an electrical transformer (15), linked via outputs (153, 155, 157) to the high- and low-voltage parts (131, 133) of the non-galvanic coupler (13) and to the microcontroller (11) so as to provide their power supply, the transformer (15) being linked to a low-voltage source (17) via a breaker switch (19), and the connection bus (9) comprising a switching member (91) controlling the open or closed state of the breaker switch (19).

8 Claims, 2 Drawing Sheets

1 - ELECTRICAL CIRCUIT
3 - CONTROL MODULE
5 - FUNCTIONAL MODULE
7 - EXTERNAL INTERFACE
9 - CONNECTION BUS
11 - MICROCONTROLLER
13 - NON-GALVANIC COUPLER
15 - TRANSFORMER

(51) Int. Cl.
*B60R 16/023* (2006.01)
*B60L 3/00* (2006.01)

(56) References Cited

U.S. PATENT DOCUMENTS

| | | | | |
|---|---|---|---|---|
| 2007/0159748 | A1* | 7/2007 | Sullivan | B66B 1/06<br>361/93.1 |
| 2008/0129207 | A1* | 6/2008 | Chao | C23C 16/26<br>315/111.21 |
| 2012/0019183 | A1* | 1/2012 | Sakane | B60L 15/16<br>318/473 |
| 2012/0185560 | A1* | 7/2012 | Mera | H04L 67/325<br>709/217 |

FOREIGN PATENT DOCUMENTS

| | | | |
|---|---|---|---|
| EP | 2353941 | A1 | 8/2011 |
| JP | 2008017595 | A | 1/2008 |
| JP | 2008043189 | A | 2/2008 |
| WO | 2353941 | * | 8/2011 |

OTHER PUBLICATIONS

English language abstract and machine-assisted English translation for JP2008043189 extracted from espacenet.com database on Dec. 31, 2014, 19 pages.

International Search Report for PCT/EP2013/062697 dated Apr. 8, 2014, 5 pages.

* cited by examiner

1 - ELECTRICAL CIRCUIT
3 - CONTROL MODULE
5 - FUNCTIONAL MODULE
7 - EXTERNAL INTERFACE
9 - CONNECTION BUS
11 - MICROCONTROLLER
13 - NON-GALVANIC COUPLER
15 - TRANSFORMER

METHOD AND SYSTEM FOR DISABLING AND ENABLING AN ELECTRIC MOTOR VEHICLE CONTROL MODULE

CROSS-REFERENCE TO RELATED APPLICATIONS

This application is the National Stage of International Patent Application No. PCT/EP2013/062697, filed on Jun. 19, 2013, which claims priority to and all the advantages of French Patent Application No. FR 12/01736, filed on Jun. 19, 2012, the content of which is incorporated herein by reference.

This invention relates to control modules for motor vehicle electrical circuits, electric motor vehicles in particular, and more particularly the disabling and enabling of the elements comprising the circuits.

BACKGROUND

In an electric or hybrid motor vehicle, one part of the electrical circuit is powered at a high voltage of the order of 400 volts, while the power supply for the control circuits generating and carrying the control signals is made with low voltage, of the order of 5 to 12 volts.

The part powered with high voltage generally comprises all of the functional power modules, such as the propulsion motor of the vehicle and the heater of the vehicle. The high voltage enables, for equal power, intensity, and therefore losses due to Joule effect, to be lowered. The part powered with low voltage for its part comprises in particular the control elements, such as a connection bus.

The two parts of the electrical circuit are separated by an isolation, called a galvanic barrier, allowing prevention of a discharge of high voltage into the low voltage part. Passages through the galvanic barrier are made by means of electrical transformers, located between the high and low voltage lines that are called upon to interact.

In order to control the functions of the circuit, the latter comprises a microcontroller, which controls the different functional modules of the circuit, according to instructions applied by the user via switching modules and/or signals emanating from sensors linked by the low voltage bus. In particular, it is impossible to make analog voltage or intensity measurements pass through the galvanic barrier without resorting to a costly converter.

Therefore, if the microcontroller is located on the low voltage side of the galvanic barrier, it will only be able to receive measurements concerning the high voltage functional modules of the circuit through interposed converters, which adversely affect precision and/or are costly.

If the microcontroller is located on the high voltage side of the galvanic barrier, it will be impossible for it to control the disabling of the device without implementing additional galvanically decoupled lines, controlling the elements forming the galvanic barrier is then particularly problematic.

SUMMARY OF THE INVENTION

In order at least partially to remedy the abovementioned deficiencies, the object of the invention is an electronic control module for a motor vehicle electrical circuit, intended to be linked in a galvanically isolated manner to a motor vehicle electrical circuit comprising at least one functional module powered at high voltage, the control module comprising:

- a connection bus, intended to be linked to an exterior interface, configured so as to conduct low-voltage electrical setpoint signals,
- a microcontroller, configured to control the at least one functional module as a function of the setpoint signals, characterized in that the microcontroller and the connection bus are linked by a non-galvanic coupler, provided with a low-voltage part and a high-voltage part, which are able to exchange a signal and are galvanically decoupled, and in that the control module furthermore comprises an electrical transformer, linked via outputs to the high- and low-voltage parts of the non-galvanic coupler and to the microcontroller so as to provide their power supply, the transformer being linked to a source via a breaker switch, and the connection bus comprising a switching member controlling the open or closed state of the breaker switch.

The control module according to this invention therefore allows disabling, which ensures a reduced consumption of the control electronics.

The control module can furthermore comprise one or more of the following characteristics, taken alone or in combination.

The connection bus is a LIN bus.

The connection bus is, alternatively, a CAN bus or a FlexRay™ bus.

The non-galvanic coupler is a photocoupler or a capacitive coupler.

The control module furthermore comprises a hold signal line linking the connection bus and the microcontroller via the non-galvanic coupler, and the switching member is configured to open the breaker switch in the absence of a hold signal on the hold signal line, and in that the microcontroller is configured to interrupt the hold signal in the absence of activity of at least one functional module for a predetermined period.

The transformer comprises an outlet galvanically isolated from the connection bus, providing a very low-voltage power supply.

Said outlet providing a low-voltage power supply can then be linked to the microcontroller, and said microcontroller can be configured to modulate the low-voltage power supply received on input in order to obtain a control signal on output to trip the high-voltage control transistors of the at least one functional module.

The invention also has as an object an associated method for disabling an electronic control module for a motor vehicle electrical circuit such as described previously, characterized in that it comprises the following steps:

- the connection bus receives a request for disablement,
- on receiving the request for disablement, the connection bus opens the breaker switch,
- the connection bus is disabled.

The invention also has as an object an associated method for disabling an electronic control module for a motor vehicle electrical circuit such as previously described, characterized in that it comprises the following steps:

- the connection bus receives an activation signal,
- the connection bus exits its disabled state,
- the connection bus closes the breaker switch.

The invention also has as an object a method such as described previously, characterized in that it furthermore comprises the following steps:

- the microcontroller detects prolonged inactivity,
- the microcontroller triggers disablement of at least part of the functional module,
- the microcontroller sends a request for disablement to the connection bus.

BRIEF DESCRIPTION OF THE DRAWINGS

Further advantages and characteristics of the invention appear on reading the following description of the figures, among which.

On all the figures, same reference numbers relate to same elements.

DETAILED DESCRIPTION

Figure 1:
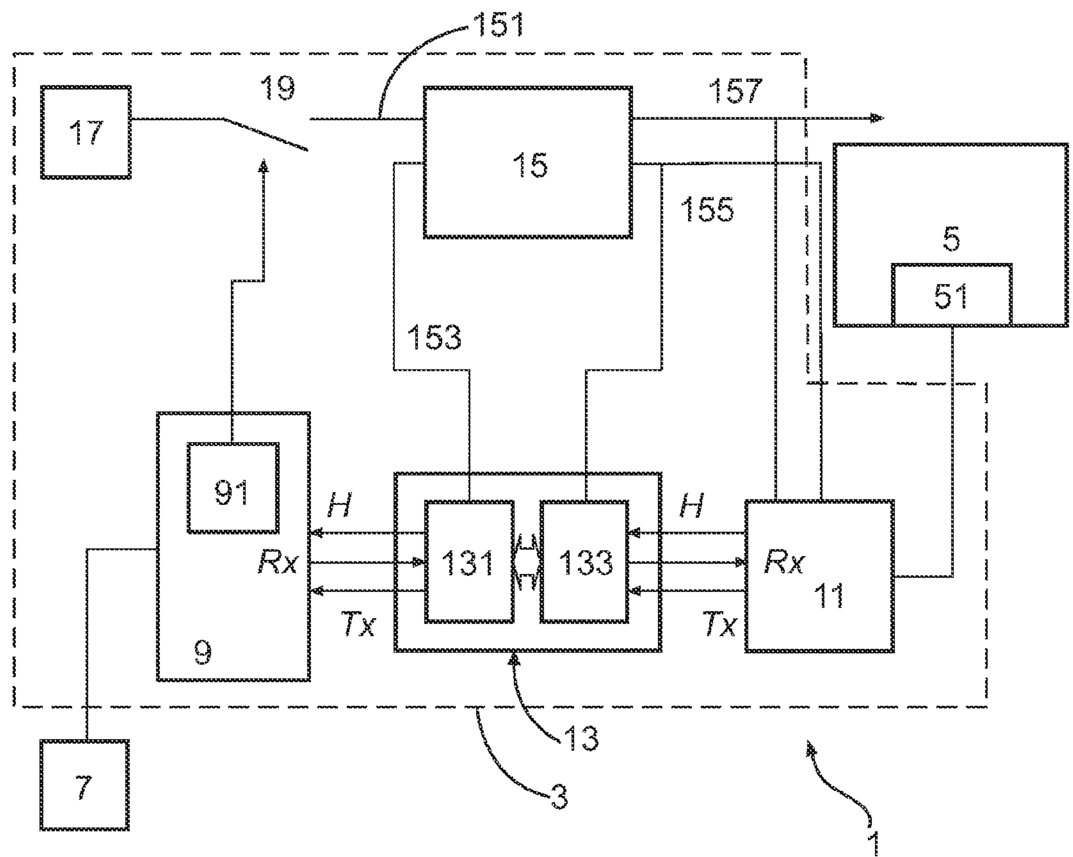
FIG. 1 is a diagrammatic representation of a motor vehicle electrical circuit comprising a control module according to the invention.

FIG. 1 shows, in a diagrammatic manner, a motor vehicle electrical circuit 1 provided with a control module 3.

In FIG. 1, the electrical circuit 1 comprises, in addition to the control module 3, a functional module 5, functioning at high voltage. The functional module 5 here represents the electrical circuit load at high voltage. This can be, in the case of an electric or hybrid vehicle, the vehicle motor and/or a heating device.

The functional module 5 functions at high voltage and high power, and must therefore be isolated from the low-voltage elements of the control module 3.

The electrical circuit 1 also comprises an exterior interface 7 linked to the control module 3, on the low-voltage side of the circuit 1, comprising sensors and/or switches for example. The sensors generate signals as a function of their detections, signals used to adapt the functioning of the functional module to conditions detected by the sensors. The switches allow a user to act upon the functioning mode of the functional module 5.

The sensors can, for example, comprise temperature sensors for the battery, to allow the motor power to be restrained in the event of the vehicle battery overheating. Alternatively or in parallel, the sensors can comprise passenger compartment temperature sensors so as to adapt the power of a heating system of said passenger compartment as a function of the temperature detected.

The switches can, for example, comprise switches implemented in the passenger compartment, at board panel level in particular, that a user places in a particular switching state so as to obtain a corresponding functioning mode of the functional module 5.

The control module 3 comprises a connection bus 9, including connections between the elements of the circuit and at least one controller. The connection bus 9 can be, for example, a bus of the type LIN (Local Interconnection Network), CAN (Controller Area Network) or FlexRay™. The LIN bus is particularly suitable if the number of sensors and switches remains limited, due to its simplicity, robustness and low cost.

The connection bus 9 is configured so as to receive, from the exterior interface 7, setpoint signals, which must be transmitted to a microcontroller 11, linked to the functional modules 5. The connection bus 9 is an interface between a communication bus of the control module 3 and the microcontroller 11, the connection bus 9 being known by its English name bus transceiver. The microcontroller 11 controls in particular a certain number of high-voltage transistors 51 of the functional modules 5, high-voltage transistors 51 tripped by means of a low-voltage signal.

The connection bus 9 and the microcontroller 11 are linked by signal lines, three in number here: a receiving line Rx, a transmission line Tx, and a hold signal line H. The receiving line Rx serves to transmit setpoint signals from the connection bus 9 to the microcontroller 11, the transmission line Tx serves to transmit setpoint signals from the microcontroller 11 to the connection bus 9. The hold signal line serves to transmit a hold signal from the microcontroller 11 to the connection bus 9.

The lines Rx, Tx and H are interrupted by a non-galvanic coupler 13. The non-galvanic coupler 13 is placed between the connection bus 9 and the microcontroller 11. The non-galvanic coupler 13 allows the transmission of signals through the lines Rx, Tx and H, while providing galvanic isolation between the connection bus 9 and the microcontroller 11.

The non-galvanic coupler 13 comprises a low-voltage part 131 and a high-voltage part 133. The low-voltage part 131 is connected to the connection bus 9, the high-voltage part 133 is connected to the microcontroller 11. The high- and low-voltage parts 131, 133 are linked to each other by a non-galvanic coupling, for example, a photocoupling, so as to create the galvanic isolation. In this configuration, the high- and low-voltage parts 131, 133 of the non-galvanic coupler 13 comprise light emitting diodes and phototransistors.

The coupling can be of the analog type if the microcontroller 11 must follow a constantly varying setpoint signal, or else of the digital type if the states of the functional module 5, which controls the microcontroller 11, can be reduced to a finite number.

Alternatively, the non-galvanic coupler 13 can be an electromechanical coupler, which relays the signal by tripping breaker switches having a digital value, or else a static contactor using semiconductors to accomplish this task.

It should be noted that the microcontroller 11 is located on the high-voltage side of the galvanic barrier, materialized here by the non-galvanic coupler 13.

The control module 3 furthermore comprises a transformer 15, for example, an inductance transformer, powered by a low-voltage source 17. The transformer 15 receives power supply current from the low-voltage source 17 at an input 151 and uses said power supply current to induce output currents in outputs 153, 155, 157, linked to the elements of the circuit 1 to be supplied with power.

The low-voltage source 17 is generally a connection to the vehicle battery via possible voltage adapters. The transformer 15 is a galvanic isolator, using, for example, one or several magnetic coupling circuits.

The first output 153 is linked to the low-voltage part 131 of the non-galvanic coupler 13, the second output 155 is linked to the high-voltage part 133 of the coupler 13, and to the microcontroller 11.

The transformer 15 can comprise an additional output 157 producing a multi-purpose low-voltage current. This multi-purpose current can in particular be of a different voltage compared with the current supplied by the other outputs 151, 153, 155.

The multi-purpose low-voltage current can be used to trip the transistors that the microcontroller 11 controls. To do this, the microcontroller 11 modulates the multi-purpose low-voltage current and uses the modulated signal as a control signal for the high-voltage transistors controlling elements of the load 5.

The transformer 15 can in particular be combined or integrated with the transformer or transformers usually arranged at galvanic barriers to produce low-voltage power supply or signal currents. In particular, in blocking the multi-purpose current, the microcontroller 11 generates a "low" state, and in allowing the multi-purpose current to pass, the microcontroller 11 generates a "high" state.

A breaker switch 19 is arranged between the input 151 of the transformer 15 and the low-voltage source 17. This breaker switch 19 can notably be a power transistor, of the MOSFET type, for example. The breaker switch 19 is controlled by a switching member 91 integral with the connection bus 9. The switching member 91 trips the breaker switch 19 between the open and closed states as a function of the signals carried on the bus 9. In particular, the switching member 91 of the connection bus 9 is configured to open the breaker switch 19 when no hold signal is detected on the hold signal line H and to close said breaker switch 19 when a hold signal is present. Conversely, the switching member 91 is also configured to close the breaker switch 19 in the presence of a hold signal on the hold signal line H.

The switching member 91 is, for its disabled or enabled state, cohesive with the connection bus 9 in that if the connection bus 9 is set to disabled, the switching member 91 also enters a disabled state, and reciprocally, an enablement of the bus 9 causes an enablement of the switching member 91.

Figure 2:
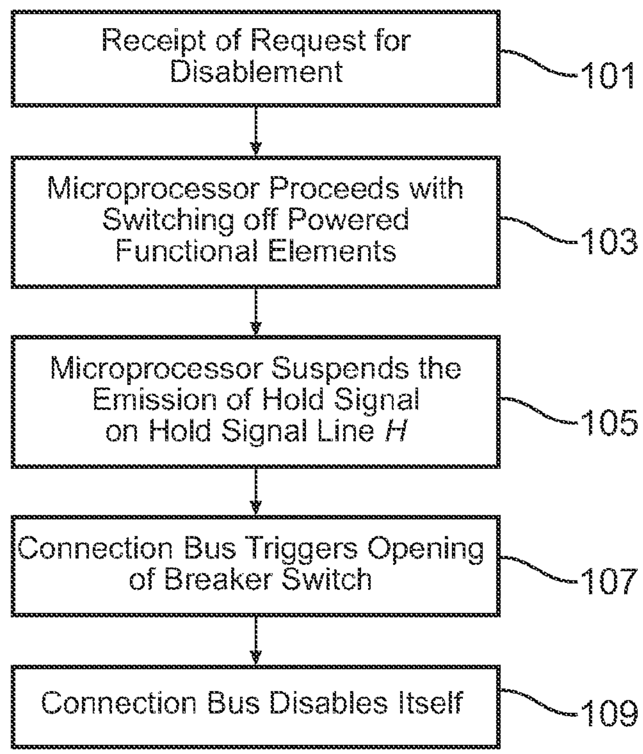
FIG. 2 is an organization chart diagrammatically listing the principal steps of a method for disabling a control module according to the invention.

FIG. 2 diagrammatically lists the principal steps of the disablement method 100 associated with the system previously described. By disablement, it is understood that the different elements of the circuit 1 are placed in a state of minimum consumption, in particular to prepare for a prolonged absence of utilization.

The first step 101 is the receipt of a request for disablement by the connection bus 9. A request for disablement is emitted by the exterior interface 7, for example, either on a break of contact (withdrawal of the key from the vehicle), or because a detector detects a condition for disablement (dangerous overheating, very low battery charge, etc.).

For example, said request can be emitted by the microcontroller 11, if the latter detects a prolonged inactivity of the device.

The detection of inactivity by the microcontroller 11 can, for example, be achieved by memorizing the electrical consumption of the functional module or functional modules 5 over a predetermined period, generally of the order of several seconds, and by verifying that the latter does not exceed a certain threshold, beyond which an activity of the module 5 is certain during the memorization period.

If a request to shut down is received by the connection bus 9 from another source, it is first transmitted to the microcontroller 11, which switches off or disables all the possible elements of the functional module or functional modules 5.

The microcontroller 11 proceeds, during the next step 103, with switching off or disabling the elements of said functional module or functional modules 5 that are still powered.

Further to switching off or disabling the electrical elements of the functional module or functional modules 5, the microcontroller 11 suspends the emission of the hold signal on the hold signal line H during the next step 105.

When it no longer receives any hold signal, the connection bus 9 triggers the opening of the breaker switch 19 during the next step 107, by means of the switching member 91. The opening of the breaker switch 19 causes the power supply to the transformer 15 to be switched off. From the moment the transformer 15 is no longer powered, its outputs 153, 155, 157 deliver no more current. The absence of current at the outputs 153, 155, 157 signifies the switching-off of the high- and low-voltage parts 131, 133 of the coupler 13, the microcontroller 11 and the multi-purpose current.

Finally, the connection bus 9 disables itself during the last step 109 by applying the disablement procedures specific to its protocol (LIN, CAN, FlexRay™, etc.). This disablement brings about that of the switching member 91.

From then on, all the elements of the circuit 1 are in their state of minimum consumption.

Figure 3:
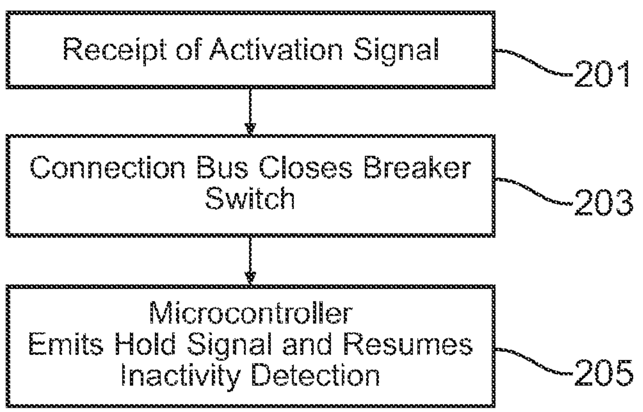
FIG. 3 is an organization chart diagrammatically listing the principal steps of a method for enabling a control module according to the invention.

FIG. 3 is a diagrammatic representation of the principal steps of an enablement method 200 of a control module 3 according to the invention.

The first step 201 is the receipt of an activation signal emanating from the exterior interface 7 through the connection bus 9. In the following step 203, the connection bus 9 closes the breaker switch 19 by means of the switching member 91.

An activation signal can, for example, be emitted by a starting detector of the interface 7 when the vehicle is started.

The closing of the breaker switch 19 brings about the switching-on of the transformer 15, and consequently the switching-on of the elements connected to the outputs 153, 155, 157: the high- and low-voltage parts 131, 133 of the coupler 13, the microcontroller 11 and the multi-purpose current line are all powered once again.

Once powered, the microcontroller 11 once again emits a hold signal and resumes inactivity detection in the next step 205.

The control module 3 as described therefore allows simple implementation of the methods for enabling and disabling said control module 3. In particular, the totality of the elements involved can be switched off without the microcontroller 11 needing to be implemented on the low-voltage side of the galvanic barrier. From then on, only the three lines Rx, Tx, H must present a galvanically isolating coupling instead of all the control lines of the functional modules 5.

The invention therefore allows the embodiment of a less costly control module, and allowing a reduction in consumption when the electronic circuit 1 of the motor vehicle is at rest.

The invention claimed is:

1. An electronic control module for a motor vehicle electrical circuit, configured to be linked in a galvanically isolated manner to a motor vehicle electrical circuit comprising at least one functional module powered at high voltage, the control module comprising:

a connection bus, configured to be linked to an exterior interface, configured so as to conduct low-voltage electrical setpoint signals emanating from the exterior interface to the elements of the control module to which they are addressed, and a microcontroller, configured to control the at least one functional module as a function of the setpoint signals, wherein the microcontroller and the connection bus are linked by a non-galvanic coupler, provided with a low-voltage part and a high-voltage part, which are able to exchange at least one signal and are galvanically decoupled, and in that the control module furthermore comprises an electrical transformer, linked via outputs to the high- and low-voltage parts of the non-galvanic coupler and to the microcontroller so as to provide their power supply, the transformer being linked to a source via a breaker switch, and the connection bus comprising a switching member controlling the open or closed state of the breaker switch.

2. The control module as claimed in claim 1, wherein the connection bus is a LIN bus.

3. The control module as claimed in claim 1, wherein the connection bus is a CAN bus.

4. The control module as claimed in claim 1, wherein the non-galvanic coupler is a photocoupler.

5. The control module as claimed in claim 1, wherein the non-galvanic coupler is a capacitive coupler.

6. The control module as claimed in claim 1, wherein the control module further comprises a hold signal line linking the connection bus and the microcontroller via the non-galvanic coupler, in that the switching member is configured to open the breaker switch in the absence of a hold signal on the hold signal line, and in that the switching member is configured to close the breaker switch in the presence of a hold signal on the hold signal line.

7. The control module as claimed in claim 1, wherein the transformer comprises an outlet galvanically isolated from the connection bus, providing a low-voltage power supply.

8. The control module as claimed in claim 7, wherein the outlet providing a low-voltage power supply is linked to the microcontroller, and in that said microcontroller is configured to modulate the low-voltage power supply received on input in order to obtain a control signal on output to trip the high-voltage control transistors of the at least one functional module.

* * * * *